United States Patent [19]

Oishi et al.

[11] Patent Number: 4,701,822
[45] Date of Patent: Oct. 20, 1987

[54] MAGNETIC TAPE CASSETTE WITH GUARD PANEL

[75] Inventors: Kengo Oishi; Osamu Suzuki, both of Kanagawa, Japan

[73] Assignee: Fuji Photo Film Co., Ltd., Kanagawa, Japan

[21] Appl. No.: 687,304

[22] Filed: Dec. 28, 1984

[30] Foreign Application Priority Data

| Dec. 28, 1983 | [JP] | Japan | 58-199198[U] |
| Dec. 28, 1983 | [JP] | Japan | 58-199199 |
| Jan. 4, 1984 | [JP] | Japan | 59-1 [U] |
| Jan. 4, 1984 | [JP] | Japan | 59-2 [U] |
| Jan. 19, 1984 | [JP] | Japan | 59-5613 [U] |
| Jan. 19, 1984 | [JP] | Japan | 59-5616 [U] |

[51] Int. Cl.⁴ .......................................... G11B 23/04
[52] U.S. Cl. ................................... 360/132; 242/198
[58] Field of Search ................ 360/132, 130.3; 242/198, 199

[56] References Cited

U.S. PATENT DOCUMENTS

| 4,234,140 | 11/1980 | Van Nie et al. | 242/199 |
| 4,386,746 | 6/1983 | Okamura et al. | 242/199 |
| 4,449,677 | 5/1984 | Ohta et al. | 242/199 |
| 4,519,521 | 5/1985 | Yoshii | 360/130.3 |
| 4,556,153 | 12/1985 | Takagi et al. | 220/334 |

FOREIGN PATENT DOCUMENTS 146218  1/1981  German Democratic Rep. ............ 360/132

Primary Examiner—John H. Wolfe
Attorney, Agent, or Firm—Sughrue, Mion, Zinn, Macpeak, and Seas

[57] ABSTRACT

A magnetic tape cassette having two symmetrical sides and which includes a cassette body having shaft-receiving holes formed respectively in right and left walls of the cassette body in such a manner that the holes are elongated in the front-to-rear direction of the cassette body. A substantially U-shaped guard panel is provided having rotary shafts on both ends engaged with the elongated holes so that the guard panel can be swung about the rotary shafts. A spring is connected between the cassette body and the guard panel to urge the latter to close the opening formed in the front wall of the cassette body.

7 Claims, 26 Drawing Figures

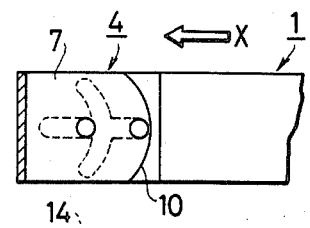
FIG. 7 (A)
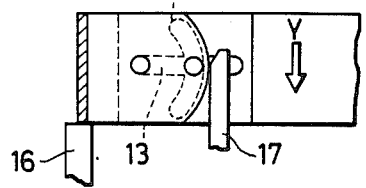
FIG. 7 (B)
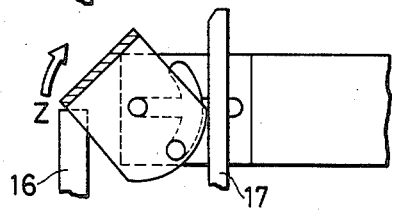
FIG. 7 (C)
FIG. 8
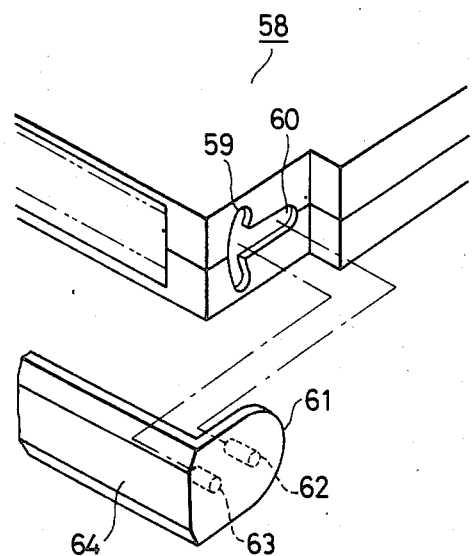

MAGNETIC TAPE CASSETTE WITH GUARD PANEL

BACKGROUND OF THE INVENTION

The present invention relates to a magnetic tape cassettes, and more particularly to a compact magnetic tape cassette substantially equal in size to so-called Philips-type magnetic tape cassette.

Recently, cassette tape recorders have been remarkably reduced both in size and in weight. Accordingly, there has been a strong demand for the provision of a magnetic tape cassette which is small in size and which is suitable for signal recording and reproducing operations with high quality and high density and which has a long playing time.

Heretofore, in the use of a compact cassette with an audio device, analog signals have most commonly been employed for recording and reproducing operations. However, in the analog system, the density of signal recording is limited. On the other hand, it is well known in the art that a digital system such as a pulse code modulation system in which input signals are converted into pulses for recording and reproducing permits recording with a high density and without distortion by signal communication paths and the recording medium.

Recently, there has been developed a magnetic head with which multi-track signal recording and reproducing operations can be performed with a magnetic tape whose width is as small as that of the magnetic tape of a Philips cassette. As a result, it is possible to carry out multi-track signal recording and reproducing operations with a magnetic tape cassette which is as compact as the Philips-type cassette.

In the case where a multi-track signal recording operation is carried out with a compact cassette in a fixed magnetic head system, for instance, in a case of using thirty-six tracks for recording signals, the width of each track is of the order of 100 microns, which is extremely small when compared with the width of each track in a four-track signal recording operation using a standard Philips-type cassette. Accordingly, the effective area of the surface of the magnetic head which is brought into contact with each track is considerably small. Therefore, if dust stuck to the magnetic tape lodges in the gap between the magnetic tape and the magnetic head, then the recording and reproducing characteristics are greatly affected.

On the other hand, a video tape cassette operated with a rotary magnetic head system is extensively employed for high-density signal recording. The video tape cassette has a rockable guard panel over the opening formed in the front wall thereof to protect the magnetic tape from damage and to prevent dust from affecting the high-density signal recording and reproducing characteristics.

In more detail, ABS resin or PS resin is most extensively employed to form the above-described magnetic tape cassette. However, when the guard panel is swung back and forth, it slides on the cassette case, forming a powder of the resin. Since the guard panel is swung to open and close the opening formed in the front end wall of the cassette case, the resin powder is produced near the opening. Accordingly, the resin powder thus produced is liable to enter the cassette case through the opening, thus adversely affecting the signal recording and reproduction characteristics of the magnetic tape.

In the rotary magnetic head system, in general, the signal recording and reproducing operations are carried out with the magnetic tape run in one direction. Thus, in the magnetic tape cassette, it is unnecessary that both sides (sides A and B) thereof be symmetrical in structure. Furthermore, in the rotary magnetic head system, in general, two magnetic heads are inclined at certain angles with respect to the tape running direction and alternately contact the magnetic tape while being rotated. This has the effect of sweeping dust away from the magnetic tape. Therefore, the effect of dust on the signal recording and reproducing characteristics is relatively small when compared with that of dust on the characteristic in the fixed magnetic head system.

A magnetic tape cassette to which the technical concept of the invention is applied is one which is operated in the fixed magnetic head system and has two sides (sides A and B) with cassette case upper and lower halves which are symmetrical in configuration. In the fixed magnetic head system, as explained above, dust adversely affects the signal recording and reproducing characteristic more than in the case of a rotary magnetic head system. Therefore, the guard panel of the magnetic tape cassette should have a more effective dust-proofing effect than that of the aforementioned video tape cassette.

SUMMARY OF THE INVENTION

Accordingly, an object of this invention is to provide a magnetic tape cassette in which the guard panel has a positive dust-proofing effect, the upper and lower halves of the cassette case are symmetrical in structure, and which can be used for multi-track signal recording and reproducing operation.

A further object of the invention is to provide a magnetic tape cassette in which the guard panel is completely locked at the closed position when the cassette is not in use, thereby to improve the dust-proofing effect, and which has two sides symmetrical in configuration and construction so as to be usable for a multi-track signal recording and reproducing operation.

Yet another object of the invention is to provide a novel magnetic tape cassette which has a guard panel adapted to open and close an opening formed in the front end wall of the cassette case and which is designed to minimize the production of resin powder when it is swung to rub the cassette case, and both sides (A and B sides) of which can be used for a multi-track signal recording or reproducing operation.

The foregoing object and other objects of the invention have been achieved by the provision of a magnetic tape cassette which has a magnetic head inserting opening in the front wall of a cassette body incorporating a pair of hubs on which a magnetic tape is wound, in which, according to the invention, the cassette body has rotary-shaft receiving holes elongated in the front-to-rear direction of the cassette body respectively in the right and left walls of the cassette body, and the cassette includes a guard panel for closing the opening, the guard panel being substantially U-shaped and having two rotary shafts which are engaged with the elongated holes in such a manner that the guard panel is swingable about the rotary shafts, and an elastic member connected between the guard panel and the cassette body to urge the guard panel to close the opening. The sides of the cassette are symmetrical in construction.

The foregoing object and other objects of the invention have also been achieved by the provision of a magnetic tape cassette having a magnetic head inserting opening in the front wall of a cassette body incorporating a pair of hubs on which a magnetic tape is wound, which, according to the invention, includes a cassette body having rotary shaft receiving grooves respectively in the front end portions of the right and left side walls thereof, each rotary shaft receiving groove having two inclined walls which converge towards the front of the cassette body and which are symmetrical in configuration with respect to a line which divides the side walls into the upper and lower parts; a guard panel adapted to close the opening and which is substantially U-shaped in horizontal section, the guard panel having rotary shafts extending from the inner surfaces of right and left end pieces thereof in such a manner that the guard panel is swingable about the rotary shafts which are engaged with the rotary shaft receiving grooves; and urging means provided on one of the right and left side walls and connected to a part of the end piece which is closer to the cassette body than the rotary shaft, thereby to urge the guard panel towards the cassette body. The two sides of the cassette are symmetrical in configuration.

Still further, the objects of the invention have been achieved by the provision of a magnetic tape cassette having a magnetic head inserting opening in the front end wall of a cassette case incorporating a pair of hubs on which a magnetic tape is wound, wherein according to the invention, the improvement comprises: a cassette case having a slide groove and an arcuate guide groove formed in each of the right and left side walls of the cassette case in such a manner that the grooves are behind the opening and the slide groove extends in the front-to-rear direction of the cassette and intersects the guide groove at the middle thereof; a guard panel substantially U-shaped in vertical section, the guard panel having a pair of end pieces at opposite ends, each of the end pieces haing first and second supporting shafts which are arranged on a line extending in the front-to-rear direction of the cassette and are engaged with the slide groove and guide groove, the guard panel being swingable vertically of the cassette and adapted to close the opening; and an elastic member connected to the guard panel to cause the guard panel to close the opening, wherein the two sides of the cassette are symmetrical in configuration and construction.

The foregoing objects of the invention have further been achieved by the provision of a magnetic tape cassette having a magnetic head inserting opening formed in the front end wall of the cassette case incorporating a pair of hubs on which a magnetic tape is wound, wherein the improvement, according to the invention comprises: a cassette case having shaft-receiving through-holes in front end portions of right and left side walls thereof, each shaft-receiving through-hole being in the form of an "L" inclined forwardly with the upper and lower halves thereof being symmetrical in configuration with respect to a line which divides the respective side wall into the upper and lower halves; a guard panel substantially U-shaped in horizontal section, the guard panel comprising right and left end pieces with rotating shafts which are slidably engaged with respective ones of the shaft-receiving through-holes, each rotating shaft having a base part and an end part which are each in the form of a flange having a diameter larger than the width of the shaft-receiving through-holes so that the guard panel is swingable vertically of the cassette and adapted to close the opening; and a tension spring provided on at least one of the right and left side walls of the cassette case and connected to the end piece at the position which is closer to the cassette case than the rotating shaft of the end piece to urge the guard panel towards the cassette case. The two sides of the cassette and symmetrical in configuration and construction so that the guard panel is swung with the rotating shafts being slid along the shaft-receiving through-holes.

The invention can also be practiced by the provision of a magnetic tape cassette having a magnetic head inserting opening in the fron end wall of a cassette case incorporating a pair of hubs on which a magnetic tape is wound, and a guard panel substantially U-shaped in horizontal section and adapted to close the opening, in which, according to the invention, the cassette case has a pair of shaft-receiving holes respectively in the front end portions of the right and left side walls of the cassette case, the shaft-receiving holes receive a pair of respective rotating shafts which extend from both end pieces of the guard panel and are covered with sleeves made of a material high in wear resistance, and the guard panel is maintained urged towards the cassette case by urging means which is provided on at least one of the right and left side walls of the cassette case. The two sides of the cassette are symmetrical in configuration and in construction.

The foregoing objects of the invention still further have been achieved by the provision of a magnetic tape cassette having a magnetic head inserting opening in the front end wall of a cassette case incorporating a pair of hubs on which a magnetic tape is wound, wherein according to the invention, the improvement comprises: a cassette case having upper and lower slopes which are formed by symmetrically chamfering at least parts of the upper and lower edges of the front end wall, and shaft-receiving holes formed in the outer surfaces of the front end portions of the right and left side walls of the cassette case; a guard panel substantially U-shaped in horizontal section which comprises right and left end pieces and a front piece having upper and lower edges extending towards the cassette case so as to be engaged with the upper and lower slopes, respectively, the guard panel being swingable on rotating shafts which extend from the inner surfaces of the right and left end pieces to engage with respective ones of the shaft-receiving holes so that the guard panel can thus open and close the opening; and urging means provided on at least one of the right and left side walls of the cassette case and connected to the respective end piece at a position which is closer to the cassette case than the rotating shaft of the respective end piece to urge the guard panel towards the cassette case. Again, the two sides of the cassette case are symmetrical in configuration and in construction.

BRIEF DESCRIPTION OF THE DRAWINGS

In the accompanying drawings:

FIGS 7A to 7C are explanatory diagrams for a description of the operation of the cassette shown in FIG. 6;

FIG. 8 is a perspective view showing a part of another example of the magnetic tape cassette according to the ivention;

DESCRIPTION OF THE PREFERRED EMBODIMENTS

Figure 1:
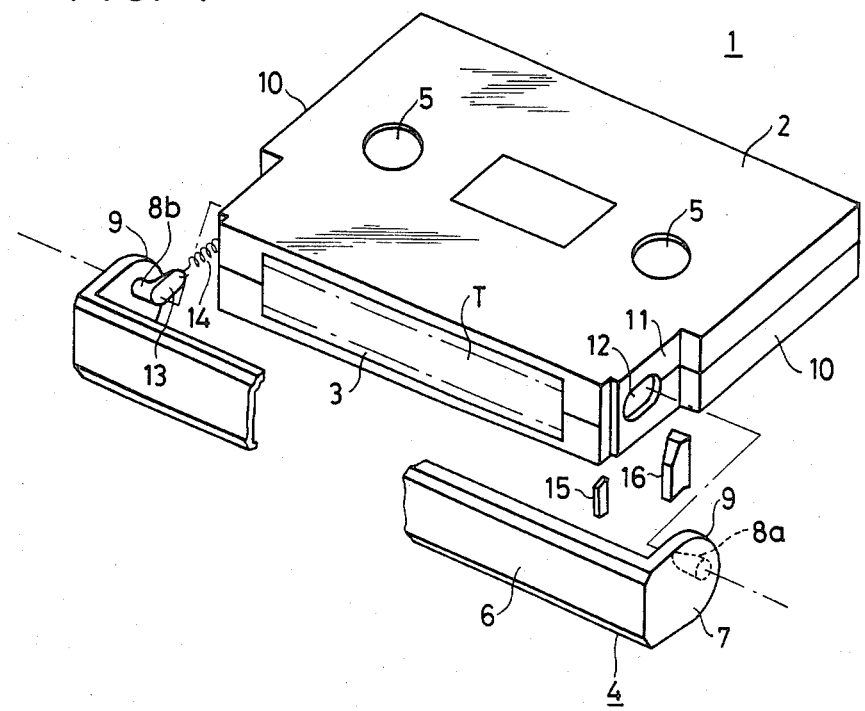
FIG. 1 is an exploded perspective view showing a magnetic tape cassette according to this invention.

As shown in FIG. 1, a magnetic tape cassette 1 according to a first embodiment of the invention is a compact cassette which is substantially the same in size as a conventional Philips-type cassette. The cassette 1 has a cassette case or body 2 with symmetricl upper and lower halves and with an opening 3 in the front wall thereof. A guard panel 4 adapted to close the opening 3 is coupled to the cassette body 2 in such a manner that it is swingable vertically of the cassette. The opening 3 is adapted to receive the recording and reproducing head, the erasing head and the pinch roller of a magnetic tape recording and reproducing device.

A magnetic tape T wound on a pair of hubs (not shown) is accommodated in the cassette body 2 in such a manner that it can run along the opening 3. The hubs are arranged in correspondence to a pair of shaft insertion holes 5 into which the drive shafts of the magnetic tape recording and reproducing device are inserted. Furthermore, a shield plate for shielding a magnetic tape from external noise in a recording or reproducing operation and a pressure pad for positively bringing the magnetic tape T into contact with the magnetic heads are provided at the opening 3 in a conventional manner.

The guard panel 4 is made up of a front wall 6 and right and left end pieces 7. The guard panel 4 is substantially U-shaped in horizontal section. Rotary shafts 8a and 8b extend from the end pieces 7 towards the cassette body so that when these rotary shafts are engaged with the cassette body, the opening 3 is closed by the guard panel 4. That is, the guard panel 4 is coupled through the rotary shafts 8a and 8b to the cassette body 3 in such a manner that it opens and closes the opening 3 when swung up and down. The rear end portions 9 of the two end pieces 7 have arcuate edges which are curved about the rotary shafts 8a and 8b.

The front portions of the right and left walls 10 of the cassette body 2 are set inwardly to form steps 11. Rotary shaft-receiving holes 12 are formed in the steps 11 at the centers in such a manner that they are elongated in the front-to-rear direction of the cassette and along the plane which divides the cassette body into the upper and lower halves. When the guard panel 4 is coupled to the cassette body 2, the rotary shafts 8a and 8b are engaged with respective ones of the elongated holes 12 in such a manner that they are slidable along the elongated holes.

In order for the guard panel 4 to be turned equally both in an upward direction and in a downward direction, the upper and lower halves of the guard panel 4 are symmetrical.

The rotary shaft 8b of the guard panel 4 has an end portion 13 which is bent backwardly of the cassette, thus forming a swing arm. A tension spring 14 arranged inside the cassette body is connected to the end portion 13 of the rotary shaft 8b, thus pulling the guard panel 4 backwardly of the cassette. When the guard panel 4 closes the opening 3, the rotary shafts 8a and 8b are positioned at the rear ends of the elongated holes 12, as a result of which the guard panel 4 is positively urged to close the opening 3 of the cassette body 2.

The cassette body 2, like a conventional one, may be made of plastic resin such as ABS resin or polyacetal; that is, the material of the cassette body is not particularly limited. The guard panel 4 may be made of plastic resin such as polyacetal or metal; however, it is desirable that the material of the guard panel be elastic to the extent that the guard panel 4 can be readily coupled to the cassette body 2.

The magnetic tape T may be a ferromagnetic iron oxide tape or chromium dioxide tape; however, it is preferable to use a metal tape or a vacuum deposition tape which is suitable for high-density recording and reproducing.

When the magnetic tape cassette thus constructed is loaded in the recording and reproducing device, the guard panel 4 is swung upwardly by a guard panel swinging mechanism provided in the cassette insertion section. The guard panel mechanism is composed of a bar-shaped opening member 15 and a slide member 16. The opening member 15 is abutted against the lower edge of the guard panel near the front end portion of the end piece 7 to raise the guard panel. The slide member 16 is brought into sliding contact with the arcuate edge of the rear end portion 9 of the end piece 7 so as to gradually slide the guard panel 4 forwardly of the cassette. Since the rear end portions 9 have arcuate edges which are curved about the rotary shafts 8a and 8b as described above, the slide member 16 is slidably in contact with the right rear end portion 9 at the same position even when the guard panel 4 is fully opened.

Figure 2:
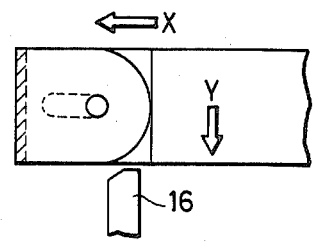
FIGS. 2A to 2C are explanatory diagrams for a description of the operation of the magnetic tape cassette of the invention.
Figure 2:
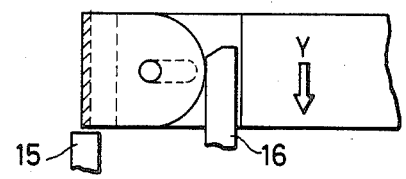
Figure 2:
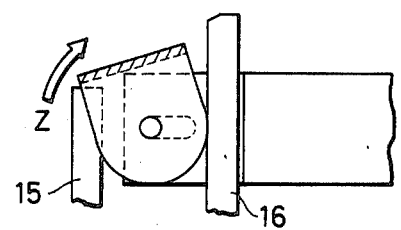

The operation of the guard panel 4 by the guard panel swinging mechanism will be described with reference to FIG. 2 in more detail.

As the magnetic tape cassette 1 is inserted into the cassette insertion section (in the direction of the arrow X), it is moved downwardly (in the direction of the arrow Y) as shown in FIG. 2A. As the cassette 1 is moved downwardly in this manner, the guard panel 4 is enagaged with the opening member 15 and the slide member 16 so that the guard panel 4 is gradually pushed upwardly by the opening member 15 and the slide member 16. More specifically, first the slide member 16 is inserted into the cassette as if to push up the rear end portion 9, as a result of which the rotary shafts 8a and 8b of the guard panel 4 are moved forwardly to the front ends of the respective elongated holes 12; i.e., the guard panel 4 is moved forwardly as shown in FIG. 2B. At the same time, as the opening member 15 is abutted against the lower edge of the guard panel 4, the latter is turned about the rotary shafts 8a and 8b upwardly (in the direction of the arrow Z) as shown in FIG. 2C. As a result, the opening 3 of the cassette body 2 is opened to permit the signal recording or reproducing operation of the magnetic tape T.

In unloading the magnetic tape cassette 1 from the recording and reproducing device, the cassette 1 is moved in the reverse direction. That is, the cassette 1 is moved upwardly to disengage from the slide member 16 and the opening member 15 while the tension spring 14 acts to cause the guard panel 4 to completely close the opening 3.

In a magnetic tape cassette whose both sides (sides A and B) are used, the guard panel should be swung symmetrically both in an upward direction and in a downward direction. This requirement can be readily satisfied by displacing the rotary shafts of the guard panel according to the invention.

In the magnetic tape cassette 1 of the invention, the guard panel 4 can be readily swung both in an upward direction and in a downward direction by displacing the rotary shafts of the guard panel. Accordingly, the cassette 1 of the invetion is suitable for multi-track recording and reproducing operations in which both sides (sides A and B) are used with fixed heads.

When the magnetic tape cassette 1 is unloaded from the recording and reproducing device, the elastic member 14 causes the guard panel 4 to completely close the opening 3 of the cassette body 2. Therefore, the guard panel 4 protects the magnetic tape T laid along the opening 3 from damage and prevents the entrance of dust through the opening 3. That is, the recording and reproducing characteristics of the tape T are maintained unchanged.

Furthermore, according to the invention, the guard panel 4 is opened by the guard panel swinging mechanism, which is extremely simple in construction. Therefore, employment of the magnetic tape cassette of the invention will not make the recording and reproducing device intricate in construction.

It has been stated that the technical concept of the invention is applied to a magnetic tape cassette which is substantially equal in size to the compact cassette. However, it should be noted that the technical concept of the invention is applicable to other various magnetic tape cassettes.

The invention will be further described with reference to a second embodiment shown in FIGS. 3 through 5 of the accompanying drawings.

Figure 3:
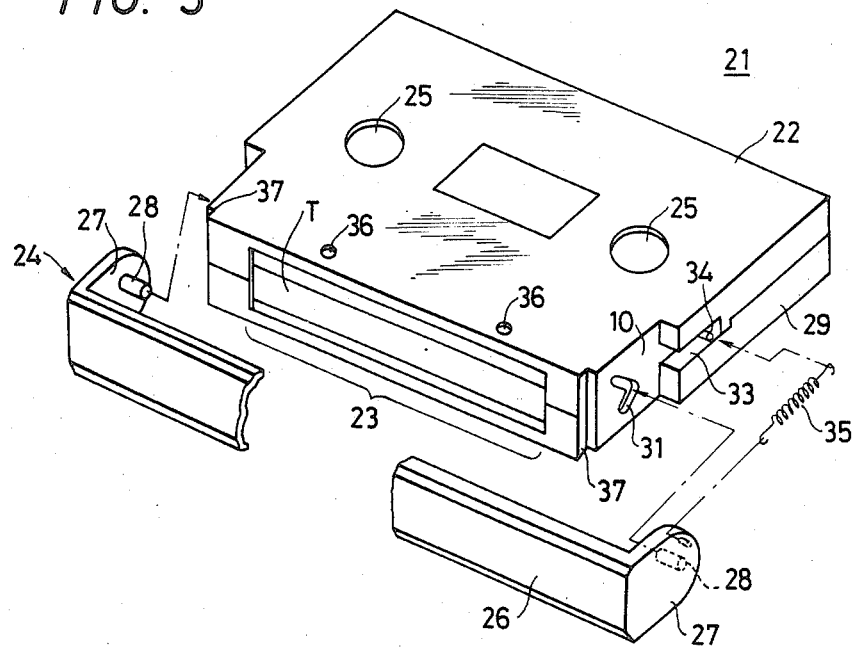
FIG. 3 is an exploded perspective view of a magnetic tape cassette of a second embodiment of the invention.
Figure 4:
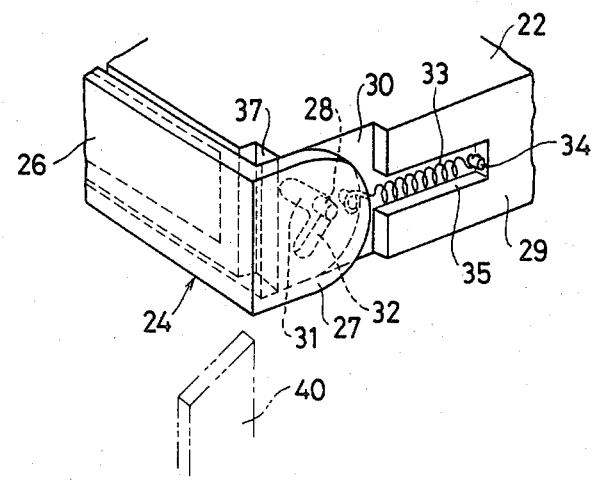
FIGS. 4 and 5 are an exploded perspective view and an exploded side view, respectively, showing essential portions of the embodiment of FIG. 3.
Figure 5:
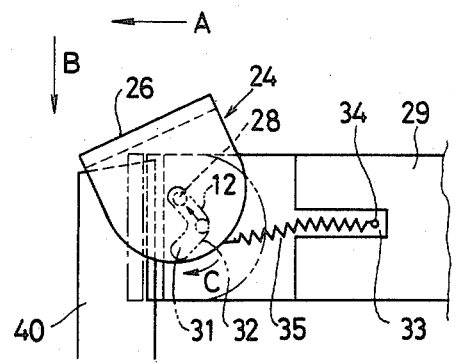

FIG. 3 is an exploded perspective view showing a second embodiment of the invention of a magnetic tape cassette, and FIG. 4 is an enlarged perspective view showing the essential components of the cassette. It should be noted that, as conductive to an understanding of this embodiment, FIG. 3 shows the magnetic tape cassette with its guard panel suitably cut.

In FIG. 3, the magnetic tape casette 21 is substantially equal in size to the conventional Philipstype cassette. The magnetic tape casette has a cassette body 22 composed of the upper and lower halves. The cassette body 22 has an opening 23 formed in its front wall and a pair of holes 36 penetrating the cassette body 22 vertically. The guard panel 24 is adapted to close the opening 23, and is coupled to the cassette body in such a manner that it is swingable vertically. The recording and reproducing head, the erasing head and the pinch roller of a magnetic tape recording and reproducing device are inserted into the opening 23, and capstans are inserted into the holes 36.

A magnetic tape T wound on a pair of hubs (not shown) is accommodated in the cassette body 22 in such a manner that it can run along the opening 23. The hubs are arranged in correspondence to a pair of shaft insertion holes 25 in a conventional manner into which the drive shafts of the magnetic tape recording and reproducing device are inserted. Furthermore, a shield plate for shielding a magnetic tape from external noise in recording or reproducing operations and a pressure pad for positively bringing the magnetic tape T into contact with the magnetic heads may be provided at the opening 23 in a conventional manner.

The guard panel 24 is made up of a front wall 26 and right and left end pieces 27. The guard panel 24 is substantially U-shaped in horizontal section. Rotary shafts 28 extend from the end pieces 27 towards the cassette body so that, when these rotary shafts are engaged with the cassette body, the opening 23 is closed by the guard panel 24. The guard panel 24 is pulled towards the cassette body by a tension spring 35 which is connected between one of the right and left side walls 29 of the cassette body and the corresponding end piece 27, and the guard panel 24 is coupled to the cassette body 22 in such a manner that it is swingable vertically of the cassette body.

In the cassette body 22, the front end portions of the side walls 29 are set inwardly to form steps 30. A spring accommodating groove 33 is formed in the side wall 29 in such a manner that it is flush with the step 30 and extends from the step 30 towards the back of the cassette body along the central line which divides the side wall 29 into two equal parts. Shaft-receiving grooves 31 are formed in the surfaces of the steps 30. Each shaftreceiving groove is L-shaped, consisting of two inclined walls 32 which diverge towards the front of the cassette body and which are symmetrical with respect to the central line which divides the side wall 29 into two parts.

Cuts 37 are formed at both corners of the front of the cassette body 22, extending in the widthwise direction of the cassette body 22.

One end of the tension spring 35 is connected to the rear end of the end piece 27 (the right one in FIG. 3), while the other end is locked to a protrusion 34 formed at the rear end of the spring accommodating groove 33 so that the guard panel 24 is pulled towards the cassette body at all times. When the guard panel 24 closes the opening, the rotary shafts 28 are positioned at the intersection of the inclined walls 32.

The cassette body 22, like a conventional one, may be made of plastic resin such as polyacetal or ABS resin;

that is, the material of the cassette body is not particularly limited. The guard panel 24 may be made of plastic resin such as polyacetal or metal; however, it is desirable that the material of the guard panel be elastic to the extent that the guard panel 24 can be readily coupled to the cassette body 22.

The magnetic tape T may be a ferromagnetic iron oxide tape or chromium dioxide tape; however, it is preferable to use a metal tape or a vacuum deposition tape which is suitable for high-density recording and reproducing.

When the magnetic tape cassette thus constructed is loaded in a recording and reproducing device, the guard panel 24 is swung upwardly by a guard panel swinging member 40 provided in the cassette insertion section. The operation of the guard panel 24 by the guard panel swinging member 40 will be described with reference to FIG. 5.

The guard panel swinging member 40 is like a plate which is engaged with one of the two ends of the guard panel 24, and it is provided at the inner corner of the cassette insertion section. When the magnetic tape cassette 21 is inserted into the cassette insertion section (in the direction of the arrow A), it is moved downwardly (in the direction of the arrow B). In this operation, the lower edge of the front wall 26 is abutted against the top of the swinging member 40 in such a manner that the top of the swinging member 40 confronts with the cut 37 described above. As the magnetic tape cassette 21 is further moved (in the direction of the arrow B), the guard panel 24 is swung (in the direction of the arrow C) while the rotary shaft 28 is moved upwardly along the inclined wall 32. In this operation, the guard panel 24 is swung while the inner surface of the front wall 26 is kept in contact with the upper edge of the front wall of the cassette body 22. When the magnetic tape cassette 21 has been loaded (being moved in the direction of the arrow B), the guard panel is held swung upwardly by the guard panel swinging member 40, thus opening the opening 23.

The upper end face of the guard panel swinging member 40 is suitably inclined so that, when the guard panel 24 has been swung upwardly, the guard panel 24 may not be displaced towards the cassette body by the elastic force of the tension spring 35.

After the guard panel has been swung upwardly to expose the opening 23, a signal recording or reproducing operation can be performed with the magnetic tape T.

In unloading the magnetic tape cassette from the recording and reproducing device, the cassette 21 is moved in the reverse direction, so that the guard panel swinging member 40 is disengaged from the guard panel 24. As a result, the guard panel 24 is moved by the force of the tension spring 35 (in a direction opposite to the direction of the arrow C), thus closing the opening 23.

The magnetic tape cassette 21 is so designed that both sides thereof are symmetrical in construction. Therefore, even when it is loaded to use the opposite side, the guard panel 24 is operated in the same manner. That is, both sides (sides A and b) of the cassette 21 can be used for signal recording and reproducing.

In the above-described second embodiment, the guard panel is swung as the magnetic tape cassette 21 is moved (in the direction of the arrow B). However, the magnetic tape cassette 21 of the invention may be used with a magnetic tape recording and reproducing device which is so designed that the guard panel swinging member 40 is moved vertically.

In the magnetic tape cassette of the invention, it is not always necessary that each shaft-receiving groove 31 be L-shaped; that is, all that is necessary for the shaft-receiving groove is to have at least one inclined wall 32. It goes without saying that the shaftreceiving grooves may penetrate the steps 30.

As is apparent from the above description, the magnetic tape cassette of the invention includes the guard panel which can be swung both in the upward direction and in the downward direction. Therefore, the cassette is suitable for multi-track recording and reproducing operations in which both sides (sides A and B) are used in fixed head system.

Immediately after the magnetic tape cassette 21 is unloaded from the recording and reproducing device, the guard panel 24 completely closes the opening 23. Therefore, the guard panel effectively protects the magnetic tape T laid along the opening 23 from damage and prevents the entrance of dust through the opening. That is, the recording and reproducing characteristics of the tape T are maintained unchanged.

Furthermore, according to the invention, the guard panel 24 is swung by the guard panel swinging member 40 which is extremely simple in construction. Therefore, employment of the magnetic tape cassette of the invention will not make the recording and reproducing device intricate in construction.

The invention will be further described with reference to a third embodiment shown in FIGS. 6 through 8 of the accompanying drawings.

Figure 6:
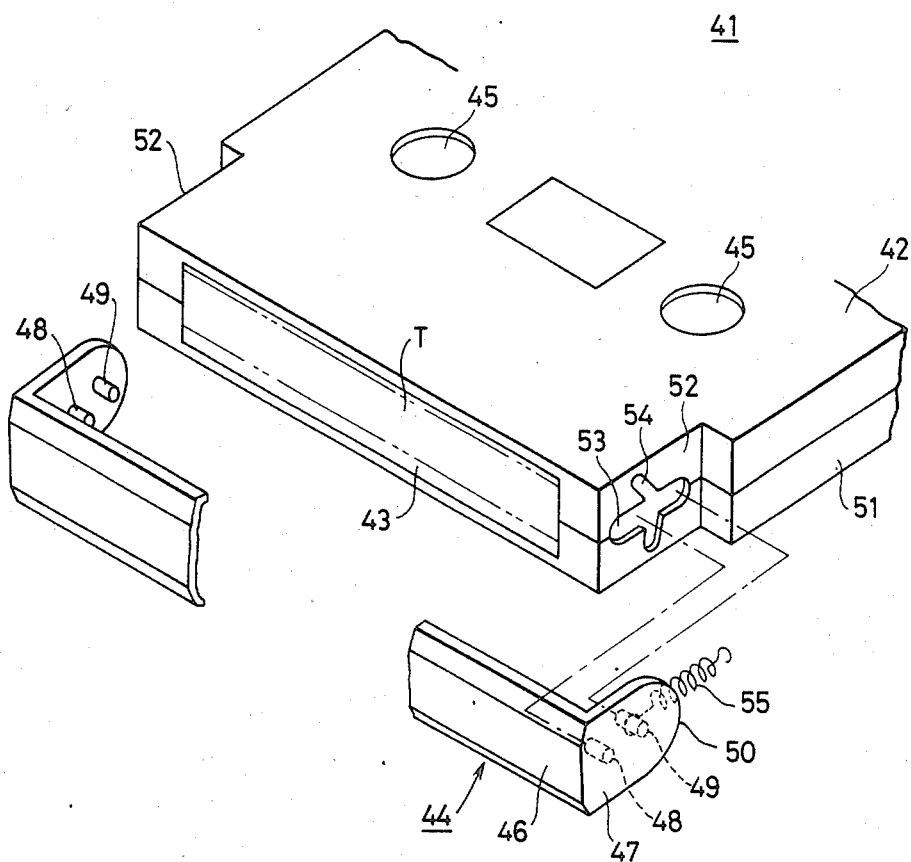
FIG. 6 is an exploded perspective view showing a third example of a magnetic tape cassette according to the invention.

The magnetic cassette case 1 shown in FIG. 6 is a compact magnetic tape cassette which is substantially equal in size to the conventional Philips-type magnetic tape cassette. A rectangular opening 43 is formed in the front end wall of the cassette case body 42 of the cassette. A guard panel 44 adapted to close the opening 43 is coupled to the cassette case body in such a manner that it is swingable vertically of the cassette. The opening 43 receives the recording and reproducing head, the erasing head and the pinch roller of a magnetic tape recording and reproducing device.

A magnetic tape T wound on a pair of hubs (not shown) is laid in the cassette case body 42 in such a manner that it can run along the opening 43. The pair of hubs are positioned at a pair of shaft insertion holes 45 in a conventional manner into which the drive shafts of the recording and reproducing device are inserted. A shield board for protecting the magnetic tape from external noise and a leaf spring (not shown) with a pressure pad adapted to positively bring the magnetic tape into contact with the magnetic head during signal recording and reproducing operations are provided at the opening 43 in the conventional manner.

The guard panel 44 is made up of a front piece 46 and two end pieces 47, being substantially U-shaped in section. Each of the two end pieces 47 has a first supporting shaft 48 and a second supporting shaft 49 which are utilized to allow the guard panel to swingably close the opening 43. The first and second supporting shafts 48 and 49 extend inwardly of the cassette, and are arranged in the front-to-rear direction of the cassette in such a manner that the second supporting shafts 49 are closer to the cassette case body 42 than the first supporting shafts 48. The guard panel 44 is coupled to the cassette case body so as to open and close the opening 43 while swinging vertically of the cassette. In order to swing the guard panel 44 both upwardly and downwardly, the upper and lower halves of the guard panel 44 are made symmetrical, and the rear edge 50 of each of the end pieces 47 of the guard panel 44 is outwardly curved about the first supporting shaft 48.

The front end portions of the right and left side walls 51 of the cassette case body 42 are set back inwardly of the cassette to form steps 52. A slide groove 53 and a guide groove 54 are formed in the substantially central portion of each step 52 extending in the front-to-rear direction of the cassette, and the guide groove 54 extends across the slide groove 53 at the middle. The slide groove 53 and each guide groove 54 are symmetrical with respect to the line which divides the side wall 51 into upper and lower halves. The guide grooves 54 are curved backwardly of the cassette. The guard panel 44 is coupled to the cassette case body 42 in such a manner that the first supporting shafts 49 are movable along the slide grooves 53 and the guide grooves 54.

One end of a tension spring 55 arranged inside the cassette case body is connected to one of the second supporting shafts 49 and the other end is connected to pin (not shown) provided inside the cassette case body so that the guard panel 44 is maintained pulled backwardly of the cassette. When the guard panel 44 closes the opening 43, the second supporting shafts 49 abut against the rear ends of the slide grooves 53 and the first supporting shafts 48 are positioned in the slide grooves 53. In this case, each end piece 47 of the guard panel 44 is held by two points on the line which extends in the front-to-rear direction of the cassette so that the guard panel is positively locked to close the opening 43.

The material of the cassette case body 42 is not particularly limited; that is, it may be a plastic resin such as polyacetal or ABS resin which is heretofore used to form the cassette case body. The guard panel 44 may be made of plastic resin such as polyacetal or metal; however, it is desirable that it be made of a material which is suitably elastic so that the guard panel 44 can be readily coupled to the cassette case body 42.

The magnetic tape T may be a ferromagnetic iron oxide or chromium dioxide tape; however, it is preferable to use a metal tape or vacuum-deposited tape suitable for a high-density signal recording and reproducing operation.

When the magnetic tape cassette 41 thus constructed is loaded in the magnetic tape recording and reproducing device, the guard panel 44 is swung upwardly by a panel opening mechanism. The panel opening mechanism is made up of a bar-shaped opening member 56 (FIGS. 7A to 7C) and a slide member 57 (FIGS. 7A to 7C). The opening member 56 is abutted against the lower edge of the front end portion of the end piece 47 of the guard panel 44 to push the latter upwardly. The slide member 57 is inserted into the cassette while contacting the rear edge 50 of the piece 47 to gradually slide the guard panel 46 forwardly of the cassette.

The operation of the guard panel 46 of the panel opening mechanism will be described with reference to FIGS. 7A to 7C.

As the magnetic tape cassette 41 is inserted into the cassette insertion section (by moving it in the direction of the arrow X) (FIG. 7A), the cassette 41 is moved downwardly (in the direction of the arrow Y). The opening member 56 and the slide member 57 are arranged below the cassette 41 so that, as the cassette 41 is moved downwardly, the members 56 and 57 push the cassette 41 upwardly. That is, the slide member 57, which is inserted in the cassette while contacting the rear edge of the end piece 57, is arranged so as to push the guard panel 44 forwardly of the cassette by utilizing the curvature of the rear edge 50 of the end piece 47. As the guard panel 44 is pushed forwardly of the cassette by the slide member 57, the first and second supporting shafts 48 and 49 in the slide grooves 53 are also moved forwardly of the cassette (FIG. 7B). When the guard panel is fully pushed, the first supporting shafts 48 are caused to abut against the front ends of the slide grooves while the second supporting shafts 49 are caused to come to the intersections of the slide grooves 53 and the guide grooves 54. The opening member 56, which is adapted to engage with the lower edge of the guard panel, swings the guard panel 44 upwardly (in the direction of the arrow Z) with the first supporting shafts 48 as rotating shafts and with the second support shafts 49 as opening slide shafts moving along the guide grooves 54 (FIG. 7C). When the guard panel 44 is fully swung, the second supporting shafts 49 are caused to abut against the ends of the guide grooves 54.

When the guard panel 44 is swung above the cassette case body as described above, the opening 43 is opened to permit the signal recording or reproducing operation of the magnetic tape T. In unloading the magnetic tape cassette 41 from the recording and reproducing device, the cassette 41 is moved upwardly, with strokes opposite to those in the cassette loading operation so that the slide member 57 and the opening member 56 are disengaged from the cassette, while the tension spring 55 causes the guard panel 44 to completely close the opening 43.

FIG. 8 shows another example of a magnetic tape cassette according to this embodiment.

In this example, the position of each guide groove 59 formed in the cassette case body 58 is different from that of the guide groove in FIG. 6. That is, the guide groove 59, which is arcuate, intersects a slide groove 60 at the front end which extends in the front-to-rear direction of the cassette, similarly to the above-described slide groove 53. The slide groove 60 and the guide groove 59 are symmetrical in configuration with respect to the line which divides the side wall into the upper and lower halves. The guide groove 59 is curved forwardly of the cassette. The guard panel 64 of the cassette is similar to the guard panel 44 in FIG. 6 except that the rear edge 61 of each end piece is outwardly curved about a second supporting shaft 62. The second supporting shafts 62 and the first supporting shafts 63 of the guard panel 64 are fitted in the slide grooves 60 and the guide grooves 59. When the cassette thus constructed is loaded in the recording and reproducing device, the guard panel 64 is swung with the first supporting shafts 63 as opening slide shafts and with the second supporting shafts 62 as rotating shafts.

As described above, in order to prevent the high-density signal recording magnetic tape cassette 41 from being adversely affected by dust, the guard panel 44 (or 64) should positively close the opening 43 of the cassette case. This requirement can be readily satisfied by supporting the two supporting shafts 48 and 49 (or 62 and 63) of each end piece on the line extending in the front-to-rear direction of the cassette.

The two supporting shafts 48 and 49 (or 62 and 63) extend from each end piece of the guard panel in such a manner that they can slide along the guide groove 54 (or 59) and the slide groove 53 (60), and the guard panel 44 (or 64) is swung with the first supporting shafts as rotating shafts and with the second supporting shafts as opening slide shafts assisting the swinging movement of the guard panel. Accordingly, the guard panel 44 (or 64) can be swung satisfactorily.

The rear edge 50 (or 61) of each of the end pieces of the guard panel 44 (or 64) or curved about the first supporting shaft 48 (or the second supporting shaft 62). Therefore, the slide member 57 is maintained in sliding contact with the rear edge until the guard panel 44 (or 64) is fully swung. Accordingly, the guard panel 44 (or 64) is stably swung.

The panel opening mechanism for operating the guard panel 44 (or 64) is considerably simple in construction. Therefore, employment of the magnetic tape cassette of this embodiment of the invention will not make the magnetic tape recording and reproducing device intricate in construction.

The invention will further be described with reference to a fourth embodiment shown in FIGS. 9 through 12 of the accompanying drawings.

Figure 9:
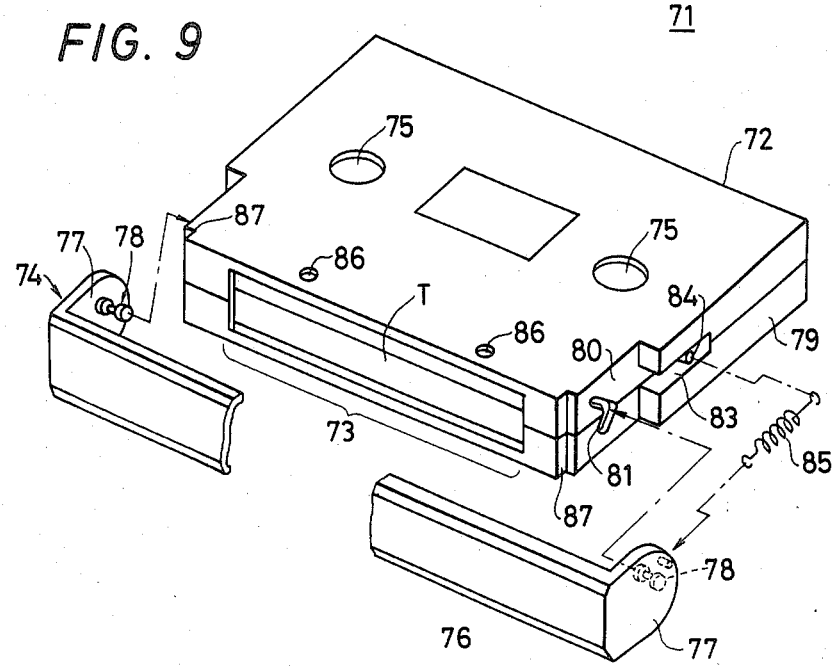
FIG. 9 is an exploded perspective view showing a fourth embodiment of the invention.
Figure 10:
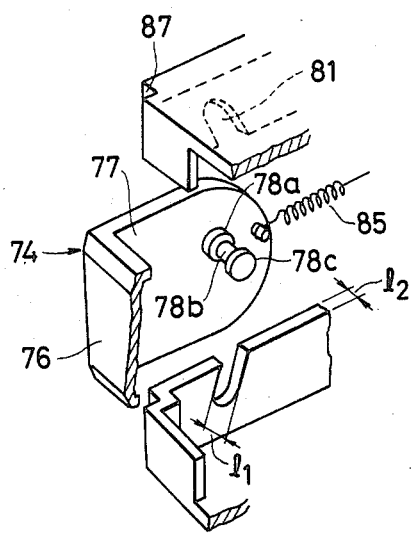
FIGS. 10 and 11 are an enlarged perspective view and an enlarged horizontal sectional view, respectively, showing essential parts of the embodiment of FIG. 9.
Figure 11:
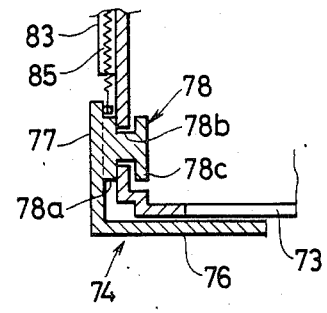

FIG. 9 is an exploded perspective view of a magnetic tape cassette of the fourth embodiment of the magnetic tape cassette of the fourth embodiment of the invention. FIGS. 10 and 11 are an enlarged exploded perspective view and an enlarged horizontal sectional view, respectively, showing essential parts of the magnetic tape cassette. As conducive to a full understanding of this embodiment, FIG. 9 shows a guard panel suitably cut away.

In FIG. 9, the magnetic tape cassette 71 is substantially equal in size to a conventional Philips-type magnetic tape cassette, and includes a cassette case 72 made up of the upper and lower halves. A rectangular opening 73 is formed in the front end wall of the cassette case 72. The cassette case 72 has a pair of through-holes 86 extending vertically of the cassette. A guard panel 74 adapted to close the opening 73 is coupled to the cassette case 72 in such a manner that is is swingable vertically of the cassette case. The opening 73 receives the recording and reproducing head, the erasing head and the pinch roller of a magnetic tape recording and reproducing device. The pair of through-holes 76 receives the capstans.

A magnetic tape T wound on a pair of hubs (not shown) is laid in the cassette case 72 in such a manner that is can run along the opening 73. The hubs, arranged at a pair of shaft-insertion holes 75, into which the drive shafts of the magnetic tape recording and reproducing device are inserted. A shield board (not shown) for protecting the magnetic tape from external noise and a leaf spring with a pressure pad adapted to positively bring the magnetic tape into contact with the magnetic head during signal recording and reproducing operations may be provided at the opening 73.

The front end portions of the right and left side walls 79 of the cassette case 72 are set back inwardly of the cassette case 72 to form steps 80. A shaft-receiving through-hole 81 for receiving a rotating shaft 78 (described below) is formed in each of the steps 80. One of the right and left side walls (the right one in FIG. 9) has a spring-receiving groove 83 which has its bottom flush with the step 80 and which extends along the center line which divides the side wall into the upper and lower halves. The upper and lower halves of each shaft-receiving through-hole 81 are symmetrical in configuration with respect to the aforementioned center line. In other words, the through-hole 81 is in the form of the character "L" which is inclined forwardly. The cassette case 72 has cuts 87 formed at oppostie ends of the front end wall thereof in such a manner that the cuts extend in the direction of thickness of the cassette case 72.

The guard panel 74 is made up of a front piece 76 adapted to close the opening 73 and end pieces 77 with rotating shafts 78. The guard panel 74 is substantially U-shaped in section. The rotating shafts 78 are protrusions extending from the end pieces inwardly of the cassette. Each rotating shaft 78 is made up of a base part 78a, a slide part 78b and an end part 78c. The base part 78a and the end part 78c are larger in diameter than the slide part 78b. The outside diameter of the slide part 78b is smaller than the width $l_1$ of the shaft-receiving hole 81, and the outside diameter of the base part 78a and the end part 78c is larger than the width $l_1$. The distance between the base part 78a and the end part 78c is slightly larger than the wall thickness $l_2$ of the step 80.

The guard panel 74 is maintained urged towards the cassette case by a tension springs 85 provided in the spring-receiving groove 83. One end of the tension spring 75 is connected to a pin on the end puece 77 which is closer to the cassette case than the rotating shaft 78, and the other end is connected to a pin 84 at the inner part of the spring receiving groove 83.

When the magnetic tape cassette 71 thus constructed is loaded in the magnetic tape recording and reproducing device, the guard panel 74 is swung upwardly by a panel opening mechanism 90 provided at the cassette insertion section of the device. The operation of the guard panel 74 by the panel opening mechanism 90 will be described with reference to FIG. 12.

The panel opening mechanism 90 is made up of a pair of plates which are engaged with the lower edge of the guard panel 74 at both ends, or a plate which is engaged with the lower edge of the guard panel at one end. The panel opening mechanism 90 is provided at the inner part of the cassette insertion section.

While the magnetic tape cassette 71 inserted into the cassette insertion section (by moving it in the direction of the arrow A) is being moved downwardly (i.e., in the direction of the arrow B), the lower edge of the front piece of the guard panel 74 is engaged with the upper end of the panel opening mechanism 90 which extends along the vertical cut 87 of the cassette case 72. As the magnetic tape cassette 71 is further moved downwardly (in the direction of the arrow B), the guard panel 74 is turned (in the direction of the arrow C) with the rotating shafts 78 being slid upwardly along the shaft-receiving holes 81. After the magnetic tape cassette 71 has been completely loaded (moved in the direction of the arrow B), the guard panel 74 is held open upwardly by the panel opening mechanism 90.

The upper end portion of the panel opening mechanism 90 is suitably tapered so that, when the guard panel has been opened, it may not be displaced towards the cassette case by the elastic force of the tension spring 85.

After the guard panel 74 has been swung upwardly to open the opening 73 of the cassette case 72, the magnetic tape T can be subjected to a recording or reproducing operation. In unloading the magnetic tape cassette 71 from the magnetic tape recording and reproducing device, the magnetic tape cassette 71 is moved with strokes opposite to those in loading it. Therefore, the guard panel 74 is disengaged from the panel opening mechanism 90 so that the tension spring 85 causes the guard panel 74 to completely close the opening (the guard panel 74 being swung in the direction opposite to the direction of the arrow C).

Therefore, when the guard panel 74 has closed the opening 73, the rotating shafts 78 thereof are held abutted against the rear walls of the bends of the respective shaft-receiving holes 81.

Each shaft-receiving hole 81 is divided into upper and lower halves by the upper and lower cassette halves. Therefore, the guard panel 74 can be readily coupled to the cassette case 72 when the upper and lower cassette halves are combined together to form the cassette case 72.

The material of the cassette 72 is not particularly limited; that is, it may be made of plastic material such as polyacetal or ABS resin. The guard panel 74 may be made of plastic resin such as polyacetal or metal; however, it is desirable that it be made of a material high in wear resistance because the rotating shafts 78 slide along the shaft-receiving holes 81.

The magnetic tape T may be a ferromagnetic iron oxide or chromium dioxide tape; however, it is preferabe to use a metal tape or vacuum-deposited tape suitable for high-density signal recording and reproducing operations.

As each rotating shaft 78 has a base part 78a, the contact area with the outer surface of the step is small during the guard panel swinging operation and the end part 78c prevents the rotating shaft 78 from coming out of the shaft-receiving hole 81, The magnetic tape cassette 71 is so formed that the upper and lower halves thereof are symmetrical in configuration and construction with each other. Therefore, even if the magnetic tape cassette 71 is loaded in the recording and reproducing device with the upper side underneath, the guard panel is operated in the same manner. That is, both sides (A and B sides) of the magnetic tape cassette can be used for signal recording and reproducing.

In the above-described embodiment, the guard panel is opened as the magnetic tape cassette 71 is moved (in the direction of the arrow B). However, the cassette 71 may be loaded in a magnetic tape recording and reproducing device in which the panel opening mechanism 90 is moved vertically. It goes without saying that an elastic member such as the tension spring 85 may be provided on both of the right and left side walls of the cassette.

As described above, the magnetic tape cassette of the invention has the guard panel 74 which can be readily swung both upwardly and downwardly. Therefore, the magnetic tape cassette of the invention is most suitable for a multi-track signal recording and reproducing operation in which both sides (A and B sides) thereof are used in the stationary head system.

When the magnetic tape cassette of the invention is unloaded from the recording and reproducing device, the guard panel 74 completely closes the opening 73 of the cassette case 72 immediately. Therefore, the magnetic tape T laid along the opening 73 of the cassette case is protected from damage and protected from the adverse effects of dust. Thus, the signal recording and reproducing characteristics of the magnetic tape T are maintained unchanged.

As each rotating shaft 78 has the base part 78a and the end part 78c, when the guard panel 74 is swung, the friction with the step 80 is small, and the rotating shaft 78 is prevented from coming out of the shaft-receiving hole 81. Thus, the guard panel 74 can be positively operated at all times.

The invention will be further described with reference to a fifth embodiment shown in FIGS. 13 through 17 of the accompanying drawings.

Figure 13:
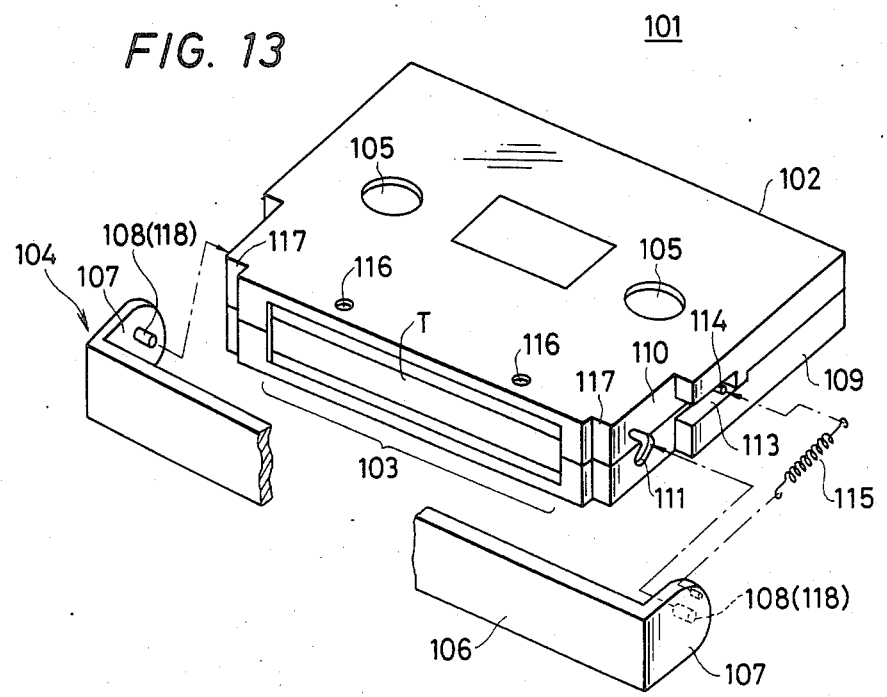
FIG. 13 is an exploded perspective view showing a fifth embodiment of a magnetic tape cassette according to the invention.
Figure 14:
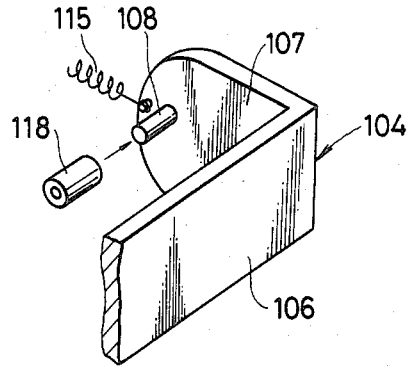
FIG. 14 is an enlarged exploded perspective view showing essential parts of a guard panel shown in FIG. 13.
Figure 12:
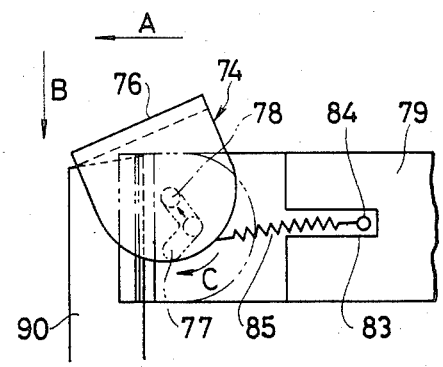
FIG. 12 is a diagrammatic side view for a description of the operation of a guard panel in FIG. 9.

FIG. 13 is an exploded perspective view showing an example of a magnetic tape cassette according to the fifth embodiment of the invention. FIG. 14 is an exploded perspective view showing essential parts of the magnetic tape cassette in FIG. 13. As conducive to a full understanding of this embodiment of the invention, FIG. 13 shows a guard panel which is suitably cut away.

The magnetic tape cassette 101 shown in FIG. 13, as in the previously discussed embodiments, is substantially equal in size to the conventional Philips-type magnetic tape cassette. The magnetic tape cassette 101 is composed of a cassette case 102 made up of upper and lower cassette halves. The cassette case 102 has a rectangular opening 103 in the front end wall thereof, and a pair of through-holes 116 which extend vertically of the cassette. The cassette 101 further includes a guard panel 104 adapted to close the opening 103 and which is coupled to the cassette case 102 in such a manner that it is swingable vertically of the cassette. The opening 103 receives the recording and reproducing head, the erasing head and the pinch roller of a magnetic tape recording and reproducing device, and the pair of holes 116 receive the capstans.

A magnetic tape T wound of a pair of hubs (not shown) is laid in the cassette case 102 in such a manner that it runs across the opening 103. The hubs are arranged at a pair of shaft-receiving holes 105 into which the drive shafts of the magnetic tape recording and reproducing device are inserted. A shield board (not shown) for protecting the magnetic tape from external noise and a leaf spring with a pressure pad adapted to positively bring the magnetic tape into contact with the magnetic head during recording and reproducing may be provided at the opening 103.

The guard panel 104 is made up of a front piece 106 and end pieces 107, being substantially U-shaped in section. A rotating shaft 108 extends from each end piece 107 inwardly of the cassette. By means of the rotating shafts 108, the guard panel 104 is coupled to the cassette case to close the opening 103. A sleeve 118 made of resin such as POM or nylon or a metal having a high wear resistance is fixed on each rotating shaft 108. The guard panel 104 is urged towards the cassette case by a tension spring 105 arranged on one of the right and left side walls 109 of the cassette case 102 so that the guard panel 104 is swingable vertically of the cassette.

The front end portions of the right and left side walls 109 are set back inwardly of the cassette case to form steps 110. One of the right and left side walls 109 has a spring-receiving groove 113 which has its bottom flush with the step 110 and which extends along the center line which divides the side wall 109 into upper and lower halves. A pair of shaft-receiving through-holes 111 are formed in the steps 110 so that the rotating shafts 108 with the sleeves 118 can slide along the holes 111 vertically of the cassette. More specifically, the upper and lower halves of each hole 111 are symmetrical in configuration with respect to the aforementioned center line; in other words, the hole 11 is in the form of the character "L" which is inclined forwardly.

The cassette case 102 has cuts 117 formed respectively at both ends of the front end wall thereof extending in the direction of thickness of the cassette case 102.

One end of a tension spring 115 is connected to a pin at the rear end of one of the end pieces 107 of the guard panel 104 (the right end piece 107 in FIG. 13), and the other end is connected to a pin 114 provided at the inner part of the spring-receiving groove 113 so that the guard panel 104 is maintained urged towards the cassette case by the tension spring 115. When the guard panel 104 closes the opening 103, the rotating shafts 108 are held abutted against the bends of the through-holes 111.

The cassette case 102 may be made of plastic resin such as polyacetal or ABS resin similarly as in the conventional cassette case; that is, the material of the cassette case 102 is not particularly limited. It is desirable that the guard panel 104 be made of plastic resin such as polyacetal which facilitates the manufacture and is relatively low in cost.

The magnetic tape T may be a ferromagnetic iron oxide or chromium dioxide tape; however, it is preferable to use a metal tape or vauum-deposited tape suitable for high-density signal recording and reproducing operations.

When the magnetic tape cassette 101 thus constructed is loaded in the magnetic tape recording and reproducing device, the guard panel 104 is swung upwardly by panel opening mechanism 120 provided in the cassette insertion section of the device.

Figure 15:
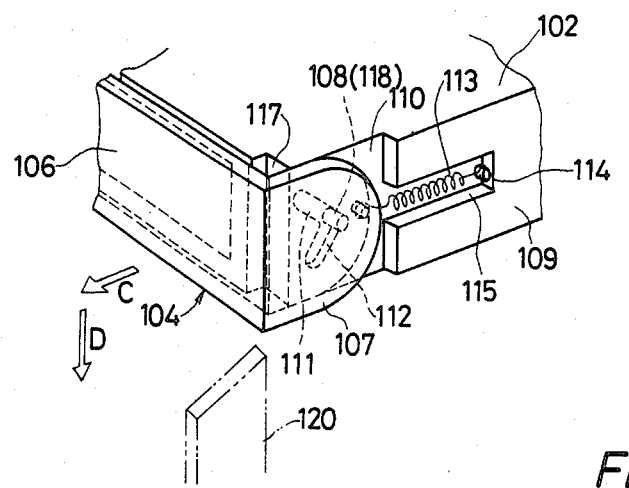
FIGS. 15 and 16 are an enlarged perspective view and a diagrammatic side view, respectively, for a description of the operation of the guard panel in FIG. 13.
Figure 17:
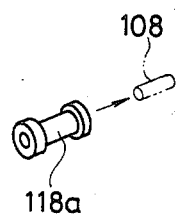
FIG. 17 is an enlarged perspective view showing a modification of sleeves in the magnetic tape cassette according to the fifth embodiment.
Figure 16:
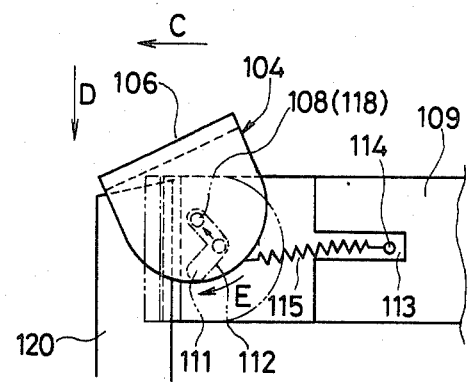

The operation of the guard panel 104 by a panel opening member 120 will be described with reference to FIGS. 15 and 16.

The panel opening member 120 is in the form of a plate which is engaged with one of the right and left end portions of the guard panel 104 and is located at the inner part of the cassette insertion secton of the recording and reproducing device.

While the magnetic tape cassette 101 inserted into the cassette insertion section (by moving it in the direction of the arrow C) is being moved downwardly (i.e., in the direction of the arrow D), the lower edge of the front piece 106 of the guard panel is caused to abut against the upper end of the panel opening member 120. This abutment takes place when the cut 117 aligns with the panel opening member 120. As the magnetic tape cassette 101 is further moved (in the direction of the arrow D), the guard panel 104 is swung (in the direction of the arrow E) while the rotating shafts 108, on which the sleeves 118 are carried, are slidably moved up the inclined walls 112 of the shaft-receiving through-holes 111. When the magnetic tape cassette 101 has been loaded, i.e., when the movement of the cassette in the direction of the arrow D has been accomplished, the guard panel 104 is maintained opened upwardly by the panel opening member 120.

After the guard panel 104 has been swung upwardly to open the opening 103 as described above, the magnetic tape T can be subjected to a signal recording or reproducing operation. In unloading the magnetic tape cassette 101 from the recording and reproducing device, the cassette 101 is moved with strokes opposite to those in loading it so that the guard panel 104 is disengaged from the panel opening member, and therefore the tension spring 115 causes the guard panel 104 to completely close the opening (the guard panel 104 being swung in the direction opposite the direction of the arrow E).

The upper and lower halves of the magnetic tape cassette 101 are symmetrical in configuration and in construction, as is apparent from the above description. Therefore, even when the cassette is loaded in the recording and reproducing device with the upper side underneath, the guard panel is operated in the same manner. That is, both sides (A and B sides) of the cassette can be used for signal recording and reproducing.

In the above-described embodiment, the guard panel 104 is opened as the magnetic tape cassette 101 is moved (in the direction of the arrow D). However, the cassette 101 may be loaded in a magnetic tape recording and reproducing device in which its panel opening mechanism 120 is moved vertically.

In the above-described embodiment, each shaft-receiving through-hole 111 is in the form of the character "L" inclined forwardly; however, the invention is not limited thereto or thereby. For instance, the cassette may be modified by, instead of the above-described shaft-receiving through-holes 111, employing holes elongated in the front-to-rear direction of the cassette that the guard panel 104 is swung vertically by moving the rotating shafts 108 (on which the sleeves 118 are put) forwardly of the cassette. In this case, it is necessary to provide means for moving the guard panel 104 forwardly of the cassette in the cassette insertion section of the recording and reproducing device.

In the above-described embodiment, the sleeves 118 is fixedly mounted on the rotating shafts 108; however, the invention is not limited thereto or thereby. For instance, the sleeve 118 may be rotatably mounted on the rotating shafts 108. In this case, the sleeve 118 is loosely mounted on the rotating shaft 108, and then the end portion of the rotating shaft 108 deformed so as to be larger in diameter.

Furthermore, in the above-described embodiment, the through-holes 111 formed in the steps are used to receive the rotating shafts; however, the through-holes 111 may be replaced by L-shaped recesses.

The sleeve 118 described above may be modified as shown in FIG. 17. A sleeve 118a in FIG. 17 has flanges at both ends, the diameter of which is larger than the width of the shaft-receiving through-hold 111. Similarly as in the sleeve 118, the sleeve 118a is fixedly mounted on the rotating shaft or it is rotatably mounted thereon.

With the sleeves 118a, the inner surfaces of the end pieces 107 will directly contact the steps 110, which eliminates the difficulty that, when the guard panel 104 is swung, the inner surfaces of the end pieces 107 rubs the steps 110 to create resin powder.

As is apparent from the above description, the magnetic tape cassette of the invention includes the guard panel 104 which can be readily swung both upwardly and downwardly. Therefore, the magnetic tape cassette of the invention is most suitable for multi-track signal recording and reproducing in which both sides (A and B sides) of a magnetic tape cassette are used in the stationary head system.

When the magnetic tape cassette of the invention is unloaded from the recording and reproducing device, the guard panel 104 completely closes the opening 103 of the cassette case 102 immediately. Therefore, the magnetic tape T laid along the opening 103 of the cassette case is protected from damage and protected from the adverse effects of dust. Thus, the signal recording and reproducing characteristics of the magnetic tape T are maintained unchanged.

According to the invention, each rotating shaft 108 is covered with the sleeve 118 or 118a. Therefore, the difficulty that, when the guard panel 104 is swung, the end pieces thereof rub the steps having the shaft-receiving through-holes of recesses 111 to create resin powder is eliminated. The wear of the rotating shafts 108 are minimized by the use of the sleeves 118 or 118a, which allows the guard panel to operate satisfactorily for long periods.

A sixth embodiment of the invention will be described with reference to FIGS. 18 through 22 of the accompanying drawings.

Figure 18:
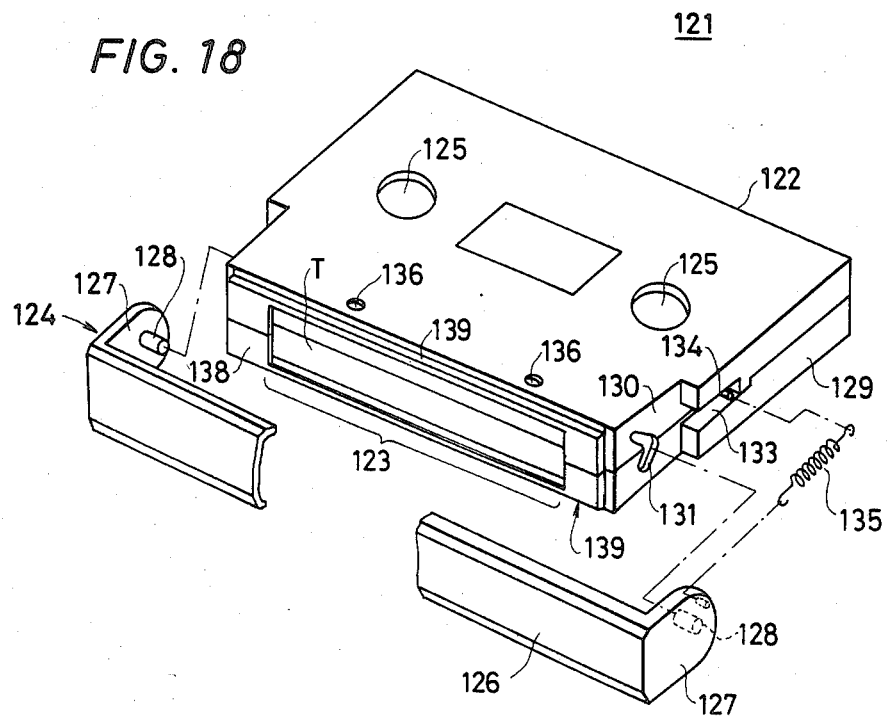
FIG. 18 is an exploded perspective view showing a sixth embodiment of a magnetic tape cassette according to the invention.
Figure 19:
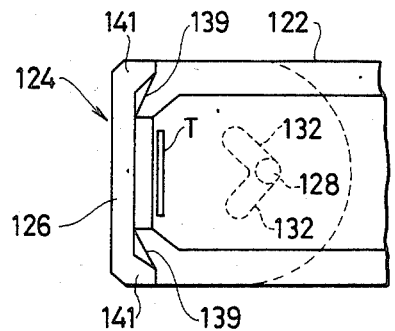
FIG. 19 is a vertical sectional view showing essential parts of the cassette of FIG. 18.

FIG. 18 is an exploded perspective view showing a sixth embodiment of a magnetic tape cassette according to the invention. FIG. 19 is a vertical sectional view showing essential parts of the cassette. As conducive to a full understanding of the invention, a guard panel suitbly cut away is shown in FIG. 18.

The magnetic tape cassette 121 in FIG. 18 is substantially equal in size to the conventional Philips-type magnetic tape cassette and includes a cassette case 122 made up of the upper and lower cassette halves. The cassette case 122 has a rectangular opening 123 in its front end wall 138, and a pair of through-holes 136 extending vertically of the cassette. A guard panel 124 adapted to close the opening 123 is coupled to the cassette case 122 in such a manner that is is swingable vertically of the cassette. The opening 123 receives the recording and reproducing head, the erasing head and the pinch roller of a magnetic tape recording and reproducing device and the pair of through-holes 136 receive the capstan.

A magnetic tape T wound of a pair of hubs (not shown) is laid in a cassette case 122 in such a manner that it can run along the opening 123. The hubs are arranged at a pair of shaft-receiving holes 125 in the conventional manner into which the drive shaft of the recording and reproducing device are inserted. A shield board (not shown) for protecting the magnetic tape from external noise and a leaf spring with a pressure pad adapted to bring the magnetic tape positively into contact with the magnetic head during signal recording and reproducing operations may be provided at the opening 123.

The upper and lower edges of the front end wall 138 of the cassette case 122 are chamfered at a suitable angle; that is, the front end wall 138 has slopes 139 extending along the upper and lower edges thereof. The angle is determined according to conditions, for instance, by a force for urging a guard panel 129 towards the cassette case. The front end portions of the right and left side walls of the cassette case 122 are set back inwardly of the cassette case to form steps 130. One of the right and left side walls (the right one in FIG. 18) has a spring-receiving groove 133 which has its bottom flush with the step 130 and which extends along the center line which divides the side wall into upper and lower halves. A pair of shaft-receiving through-holes 131 are formed in the steps 130. Each shaft-receiving through-hole 131 is in the form of the character "L" inclined forwardly. More specifically, the upper and lower halves of each shaft-receiving through-hole are symmetrical in configuration with respect to the aforementioned center line.

The cassette case 122 has a pair of cuts 137 at both ends of the front end wall 138 thereof.

The guard panel 124 is made up of a front piece 126 adapted to close the opening 123 and end pieces 127, being substantially U-shaped in horizontal section. The upper and lower edges 141 of the front piece 126 are symmetrically extended towards the cassette case 122 in order to improve the dust-proofing effect (FIG. 19). The right and left end pieces 127 have rotating shafts 128 at their centers, which extend inwardly of the cassette. With the rotating shafts 128 fitted in the shaft-receiving through-holes 131, the guard panel covers the opening 123. A tension spring 135 is arranged in the spring-receiving groove 133 formed in the cassette's side wall 129 to urge the guard panel towards the cassette case, thereby to permit the guard panel to swing. More specifically, one end of the tension spring 135 is connected to a pin at the rear end of the end piece 127 (the right one in FIG. 18), and the other end is connected to a pin 134 at the inner part of the spring-receiving groove 133. Therefore, the guard panel 124 is maintained urged towards the cassette case, and when the guard panel 124 closes the opening, the rotating shafts 128 are abutted against the bends of the inclined-L-shaped through-holes 131.

The cassette case 122 may be made of plastic resin such as polyacetal or ABS resin which is used to form a conventional cassette case. That is, the material of the cassette case 122 is not particularly limited. The guard panel 124 may be made of plastic resin such s polyacetal or metl; however, it is desirable that it be made of a material which is elastic to the extent that the guard panel can be readily coupled to the cassette case 122. The magnetic tape T may be a ferromagnetic iron oxide or chromium dioxide tape; however, it is preferable to use a metal tape or vacuum-deposited tape suitable for high-density signal recording and reproducing operations.

When the magnetic tape cassette thus constructed is loaded in the recording and reproducing device, the guard panel 124 is swung upwardly by a panel opening member 140 which is provided in the cassette insertion section of the device.

Figure 20:
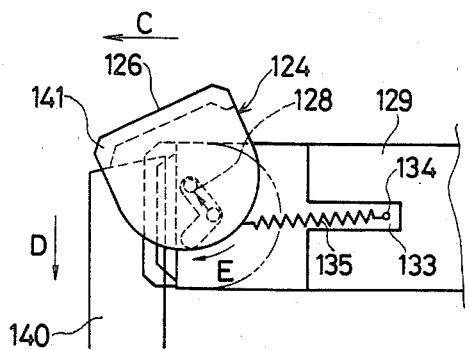
FIGS. 20 and 21 are diagrammatic side views for a description of the operation of a guard panel shown in FIGS. 18 and 19.
Figure 21:
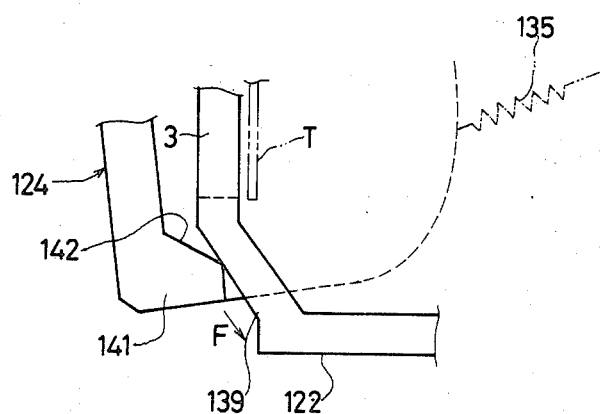

The operation of the guard panel 124 by the panel opening member 140 will be described with reference to FIGS. 20 and 21.

The panel opening member 140 is in the form of a plate which is engaged with one of the right and left end portions of the guard panel 124 and is located at the inner part of the cassette insertion secton of the recording and reproducing device.

While the magnetic tape cassette 121 inserted into the cassette insertion section (by moving it in the direction of the arrow C) is being moved downwardly (i.e., in the direction of the arrow D), the lower edge 141 of the front piece 126 of the guard panel 124 is caused to abut against the upper end of the panel opening member 140. This abutment takes place when the cut 137 aligns with the panel opening member 140. As the magnetic tape cassette 121 is further moved (in the direction of the arrow D), the guard panel 124 is swung (in the direction of the arrow E) while the rotating shafts 178 are moved up the inclined walls 132 of the shaft-receiving through-holes 121. In this operation, the guard panel is swung with the inner surface of the front piece 126 being in contact with the upper edge of the front end wall of the cassette case. When the magnetic tape cassette 121 has been completely loaded, i.e., when the movement of the cassette in the direction of the arrow D has been accomplished, the guard panel 124 is maintained open upwardly by the panel opening member 140 to open the opening 123.

The upper end portion of the panel opening member 140 is suitably tapered so that, when the guard panel has been swung, the guard panel may not be displaced towards the cassette case by the elastic force of the tension spring 135.

After the guard panel 124 has been swung upwardly to open the opening 123 as described above, the magnetic tape T can be adjusted to a signal recording or reproducing operation. In unloading the magnetic tape cassette 121 from the recording and reproducing device, the cassette 121 is moved with strokes opposite to the those in loading it so that the guard panel 124 is disengaged from the panel opening member 140. Immediately before the guard panel 124 completely closes the opening 123, the lower edgge 141 of the front piece 126 of the guard panel is abutted against the lower slope 139 as shown in FIG. 21. Then, the guard panel 124 is slid down the lower slope 139 (in the direction of the arrow F) by the elastic force of the tension spring to reach a predetermined position, thereby to completely close the opening. When the guard panel 124 has completely closed the opening 123, the upper and lower edges of the guard panel 124 are in contact with the upper and lower slopes 139, respectively, of the cassette case 122 so that the guard panel 124 is fixedly held to close the opening 123.

In the above-described embodiment, the upper and lower edges of the front end wall 138 are formed, in their entireties, into the upper and lower slopes 139, respectively. However, the objects of the invention can be achieved by forming parts of the upper and lower edges of the front wall 138 into the upper and lower slopes 139.

Each of the upper and lower edges 141 of the guard panel 124 may be so designed that, as shown in FIG. 19, the thickness is larger towards the base to increase the mechanical strength. In this case, it is necessary that slopes 142 formed on the inside of the guard panel 124 be larger in the angle of inclnation than the slopes 139 of the cassette case 122 to permit the guard panel 4 to close the opening 123 without forming a gap therebetween.

Figure 22:
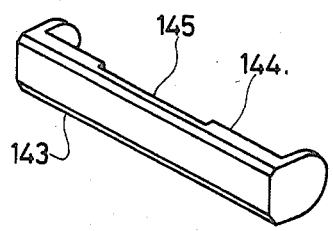
FIG. 22 is a perspective view showing a modification of the guard panel of the cassette according to the sixth embodiment.

The guard panel may be modified as shown in FIG. 22. In the guard panel 143 in FIG. 22, the upper and lower edges 144 are partially recessed (as indicated at 145) at the position where the recording and reproducing head (not shown), etc. are inserted into the cassette. When the guard panel 143 is swung to fully open the opening 123, the angle of swing can be smaller; that is, the guard panel 143 can fully open the opening 123 with a smaller angle of swing. Therefore, the amount of vertical movement of the cassette case 122 in the recording and reproducing device can be reduced, which contributes to miniaturization of the recording and reproducing device.

In the above-described embodiment, the guard panel is opened as the magnetic tape cassette 121 is moved (in the direction of the arrow D). However, the cassette 121 may be loaded in a magnetic tape recording and reproducing device in which the panel opening member 140 is moved vertically.

In the above-described embodiment, each shaft receiving through-hole 131 is in the form of the character "L" inclined forwardly; however, the invention is not limited thereto or thereby. All that is necessary for the shaft receiving through-holes 131 is to have the above-described inclined walls 132. It goes without saying that the shaft receiving through-holes 131 may be through-holes formed in the steps 130.

As is apparent from the above description, the magnetic tape cassette of the invention includes the gurd panel 124 (or 143) which can be readily swung both upwardly and downwardly. Therefore, the magnetic tape cassette of the invention is most suitable for a multi-track signal recording or reproducing operation using both sides (A and B sides) of a magnetic tape cassette in the stationary head system.

According to the invention, the cassette case 122 has the symmetrical upper and lower slopes 139 along the upper and lower edges thereof. Therefore, when the cassette 121 is unloaded from the recording and reproducing device, the guard panel 124 (or 143) is moved to the position where it can completely close the opening 123. Therefore, the cassette 121 of the invention is considerably effective in protecting the magnetic tape laid along the opening 123 from damage and from the effects of dust. Thus, the signal recording and reproducing characteristics of the magnetic tape T can be maintained unchanged.

We claim:

1. A magnetic tape cassette having a cassette case including upper and lower halves, a front wall, and laterally opposed right and left side walls, a magnetic head inserting opening in the front wall of said cassette case, said case incorporating a pair of hubs on which a magnetic tape is wound, the improvement comprising:

said cassette case having shaft-receiving holes respectively in said right and left side walls thereof, said cassette case shaft-receiving holes comprising two oppositely inclined elongated, intersecting grooves adjacent said front wall and diverging towards the front wall, said intersecting grooves terminating at their intersection, and said cassette case being provided with a guard panel for closing said opening, said guard panel being substantially U-shaped and including a front piece and right angle end pieces at opposite ends of said front piece and having two shafts fixidly mounted respectively to each of said end pieces, said shafts being engaged with said elongated holes in such a manner that said guard panel is vertically swingable about said shafts, and an elastic member connected between said guard panel and said cassette case to urge said guard panel to close said opening with said shafts positioned in a plane passing through the intersection of said intersecting grooves; and wherein the two halves of said cassette case are symmetrical in configuration.

2. A magnetic tape cassette having a cassette case including upper and lower case halves, a front wall and laterally opposed right and left side walls, a magnetic head inserting opening in the front wall of said cassette case, said cassette case incorporating a pair of hubs on which a magnetic tape is wound, the improvement comprising:

said cassette case further having shaft-receiving grooves respectively in front end portions of said right and left side walls thereof, each shaft-receiving groove having two intersecting inclined groove portions which terminate at their intersection, which diverge toward the front wall of said cassette case and which are symmetrical in configuration with respect to a line which divides said side wall into upper and lower parts;

a guard panel adapted to close said opening and being substantially U-shaped including a front piece and right and left end pieces at opposite ends of said front piece, said guard panel having shafts extending from inner surfaces of each said right and left end pieces in such a manner that said guard panel is swingable about said shafts, said shafts being engaged with said shaft-receiving grooves; and biasing means provided on one of said right and left side walls and connected to a part of the respective end piece at a point closer to the respective free end of the guard panel than said rotary shaft and located along the center line of said guard panel to thereby urge said guard panel towards said cassette case and said shafts towards the intersection of said inclined groove portions; and wherein:

said upper and lower halves of said cassette case are symmetrical in configuration.

3. A magnetic tape cassette having a cassette case including upper and lower case halves, a front wall, a rear wall and laterally opposed right and left side walls, a magnetic head inserting opening in the front wall of said cassette case, said cassette case including a pair of hubs on which a magnetic tape is wound, the improvement comprising:

said cassette case having a slide groove extending in the direction from the front wall toward said rear wall, and a guide groove having oppositely inclined portions intersecting said slide groove and having oppositely inclined guide groove portions formed within each of said right and left side walls of said cassette case behind said opening;

a substantially U-shaped guard panel having a front piece and a pair of end pieces at opposite ends of said front piece, each of said end pieces having first and second supporting shafts arranged in line extending in said front-to-rear direction of said cassette case and being spaced apart for selective engagement with said slide groove and guide groove, said guard panel being swingable vertically of said cassette case with one of said first and second supporting shafts within said slide groove and the other shaft within said guide groove; and an elastic member connected to said guard panel to cause said guard panel to close said opening with the spacing between said first and second shafts being such that with the guard panel closed, the first and second shafts are both within said slide groove and said guard panel is prevented from swinging vertically of said said cassette case, and wherein:

the two halves of said cassette case are symmetrical in configuration and construction.

4. The magnetic tape cassette of claim 3, wherein said slide groove intersects said guide groove at a middle portion of said slide groove.

5. The magnetic tape cassette of claim 3, wherein said slide groove intersects said guide groove at an end of said slide groove adjacent said opening.

6. A magnetic tape cassette having a cassette case including upper and lower case halves, a front wall, a rear wall and laterally opposed right and left side walls, a magnetic head inserting opening in the front end wall of a cassette case, said cassette case incorporating a pair of hubs on which a magnetic tape is wound, the improvement comprising:

said cassette case having upper and lower slopes formed by symmetrically chamfering at least parts of upper and lower edges of said front end wall, shaft-receiving holes being formed in the front end portions of said right and left side walls of said cassette case;

a U-shaped guard panel including a front piece and right and left end pieces at respective end thereof, said front piece of said guard panel having an upper and lower edges extending towards said cassette case so as to be engaged with said upper and lower slopes, respectively, shaft fixedly extending from the inner surfaces of said right and left end pieces and engaged within respective ones of said shaft-receiving holes to permit said guard panel to swing about said rotary shafts and to open and close said opening; and urging means provided on at least of one said right and left side walls of said cassette case and connected to the respective one of said end pieces at a position closer to said cassette case than said rotary shaft of said respective one end piece to urge said guard panel towards said cassette case, said cassette case shaft receiving holes comprising two oppositely inclined intersecting grooves diverging toward the front wall of said cassette case and being symmetrical in configuration with respect to a line dividing said cassette case into said upper and lower halves; such that said urging means causes said shafts to be positioned within the intersection of said inclined intersecting grooves with said guard panel closing off said opening, and wherein the two sides of said cassette are symmetrical in configuration and in construction.

7. The magnetic tape cassette of claim 6, wherein said guard panel has recesses at edges thereof at positions adjacent where a recording and reproducing head is inserted into said cassette.

* * * * *